Figure 4:
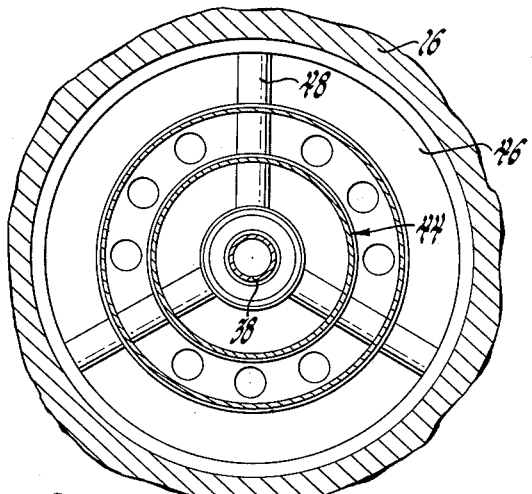

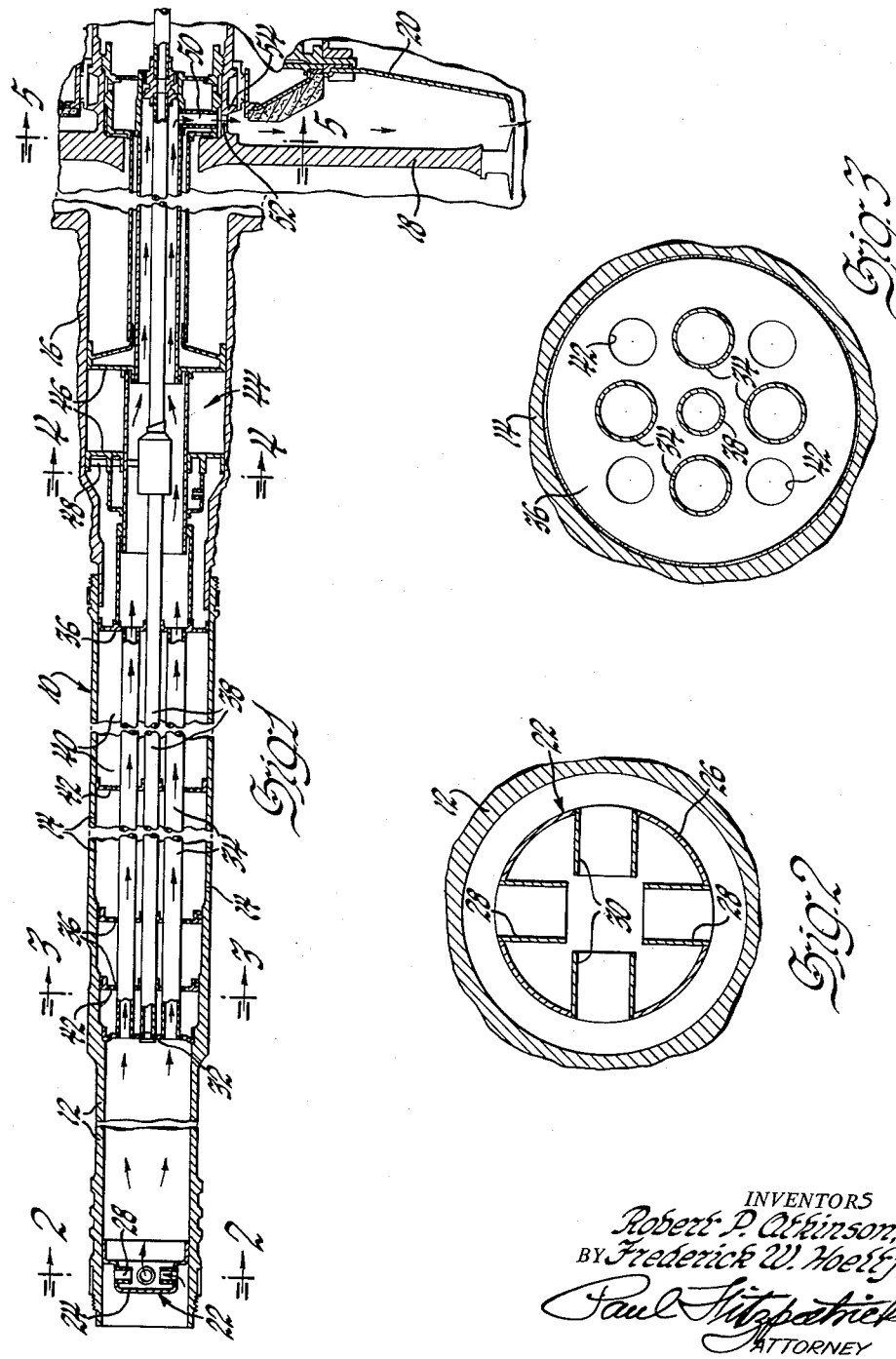

July 3, 1962 R. P. ATKINSON ETAL 3,041,832
LUBRICATION VENT FOR A TURBINE ENGINE
Filed May 12, 1959 2 Sheets-Sheet 2

INVENTORS
Robert P. Atkinson &
BY Frederick W. Hoeltje

Paul Fitzpatrick
ATTORNEY

United States Patent Office 3,041,832
Patented July 3, 1962

3,041,832
LUBRICATION VENT FOR A TURBINE ENGINE
Robert P. Atkinson, Indianapolis, and Frederick W. Hoeltje, Speedway, Ind., assignors to General Motors Corporation, Detroit, Mich., a corporation of Delaware
Filed May 12, 1959, Ser. No. 812,778
6 Claims. (Cl. 60—39.08)

This application is a continuation-in-part of our application S.N. 660,503 filed May 28, 1957, now abandoned.

The present invention relates to a turbine engine of the type comprising compressor, combustion and turbine sections and, more particularly, to a unique lubrication vent system therefor.

Turbine engines of the type herein contemplated may be advantageously employed in driving the propeller of an aircraft, and usually include a hollow power shaft extending substantially throughout the engine for connection through suitable reduction gearing to the propeller. Moreover, a multi-stage axial flow compressor section is adapted to be driven by this shaft which, in turn, is driven by the turbine section. If desired, another turbine-driven shaft may surround the power shaft for mounting additional compressor wheels.

In all such turbine engines, it is necessary to supply lubricant under pressure to various bearings including those supporting the power shaft and other shafts which may be incorporated in the engine structure as aforementioned. Some of this lubricating oil forms a mist with air in the engine around the parts lubricated. The air which becomes oil-laden includes air leaking through seals in the engine which must be discharged from the engine. Also, air mixed with oil scavenged from the engine must be discharged or vented. This air may separate from the oil in a lubricant reservoir associated with the engine, but it remains contaminated with oil. Thus, in prior lubricating systems, venting means having been associated with the engine, gear box and other portions of the assembly to dump oil-bearing air "overboard" or directly to atmosphere. That is to say, in the case of a gear box lubricating system, suitable structural means were provided to vent the oil-bearing air directly out of the gear box to atmosphere. Since the air bears fine droplets of lubricant, it results in covering the engine or aircraft with an objectionable oil slick which gathers dirt and other particles of material from the air.

It is, therefore, a feature and object of this invention to provide a turbine engine of the type aforementioned with a lubrication vent system in which the oil bearing air which is vented is precluded from being deposited upon the exterior of the engine.

More particularly, it is a principal feature and object of this invention to provide a lubrication vent system in which the vented air is delivered to the engine exhaust.

Moreover, it is another object of this invention to provide a lubrication vent system of the type aforementioned in which the air to be vented is delivered to a hollow power shaft communicating with the exhaust section of the engine for delivery into the engine exhaust duct, whereby air is vented by reason of the pressure drop between the vent air inlet and outlet rather than by an aspirating effect.

In general, these and other features, objects and advantages of this invention are achieved by delivering the oil-laden air to be vented to the interior of a forward section of the engine power shaft. The air is then directed through a baffling system to expel as much liquid oil as possible from the air, which then passes through suitable conduits fixed within the power shaft for rotation therewith to a discharge outlet into the engine exhaust stream near the engine tailcone. As a result, air which contains a reduced amount of liquid oil in the form of a mist or spray is delivered directly into the engine exhaust gas at the rear of the engine.

Figure 5:
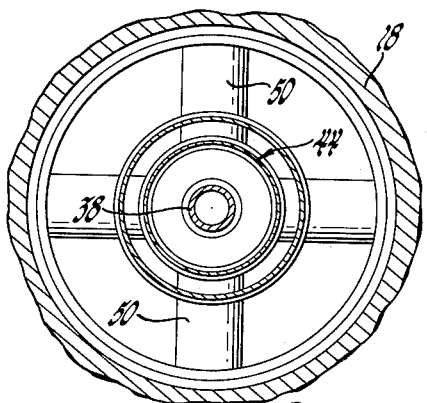
Figure 6:
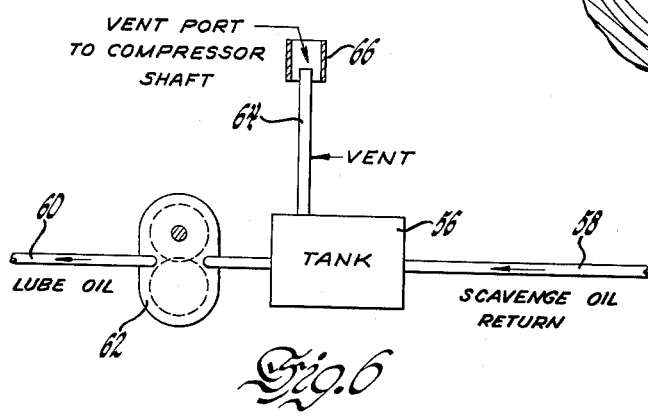

These and other features, objects and advantages of this invention will appear more fully hereinafter as the description of the invention proceeds and in which reference is made to the following drawings in which:

FIGURE 1 is a longitudinal section of the power shaft of a turbine engine;
FIGURE 2 is a cross section taken on line 2—2 of FIGURE 1;
FIGURE 3 is a cross section taken on line 3—3 of FIGURE 1;
FIGURE 4 is a cross section taken on line 4—4 of FIGURE 1;
FIGURE 5 is a cross section taken on line 5—5 of FIGURE 1; and
FIGURE 6 is a schematic showing of a portion of a lubrication system in which this vent system may be incorporated.

In the drawings, only the hollow power shaft of the turbine engine has been shown inasmuch as a description of other details of the engine is not necessary for a complete understanding of the invention. Suffice it to say that the compressor, combustion and turbine sections will be arranged about the power shaft as is the usual practice to provide the driving force for the shaft.

In FIGURE 1, there is indicated generally at 10 a hollow turbine engine power shaft which includes a forward section 12, an intermediate section 14, and a rear section 16. The turbine section of the engine normally will be disposed about the rear shaft section 16 and operatively connected thereto to drive a more forwardly located compressor section and, ultimately, a work device such as an aircraft propeller. The turbine section includes one or more turbine wheels, the rearmost one 18 of which is shown as disposed forwardly of a wall 20 which preferably is a part of the tailcone of the engine about which combustion gases are exhausted to atmosphere. As is the usual practice, suitable splines or other means are provided at the forward end of the forward power shaft section 12 for connection to a gear reduction box for driving an aircraft propeller or other device.

A baffle cap structure 22 (FIGS. 1 and 2) fixedly secured at the forward end of the forward power shaft section 12 for rotation therewith includes a transverse wall 24 closing off direct axial flow of air through the interior of the hollow power shaft, and a cylindrical wall portion 26 projecting axially therefrom and radially inwardly spaced from the adjacent shaft wall. Two or more pairs of radially inwardly directed opposed vent air inlet tubes 28 and 30 are adapted to deliver vent air to the interior of the forward shaft section 12. This structure provides a centrifugal oil separator.

A closure plate 32 is piloted in and secured for rotation with the power shaft between the forward and intermediate sections thereof and contains a plurality of apertures therethrough for receiving a plurality of vent tubes 34, herein shown to be four in number. One or more spaced support plates 36 (FIG. 3) are secured for rotation in the intermediate section 14 of the power shaft to the rear of closure plate 32. Each of these plates contains a central aperture for supporting a lubricant supply tube 38 and a plurality of apertures for supporting the four parallel air vent tubes 34 which are substantially equidistantly spaced about the lubricant tube 38 and extend substantially parallel with the axis of the power shaft. The chamber 40 defined by the outer wall of the lubrication tube 38 and the inner wall of the shaft section 14 through which the vent tubes 34 extend will ordinarily contain air under high pressure for various reasons such as leakage of air from the turbine section. Therefore, it is desirable to provide a plurality of circumferentially spaced openings 42 in each of the support plates 36 so as to equalize pressures on either side thereof.

It will be appreciated, as aforementioned, that the intermediate power shaft section 14 may be surrounded by and support a compressor section and perhaps several bearings. Threfore, radial struts (not shown) having suitable lubricating passages therein will extend from the lubricant tube 38 to these bearings and project between the various vent tubes 34.

Adjacent the rear of the intermediate power shaft section 14, the vent tubes 34 discharge into a relatively large single air vent tube 44 (see FIG. 4) constituted of several coaxial sections supported in other plates 46 in the rear shaft section 16 as shown. The lubricant tube 38 extends through a central aperture in the support plates 46 and coaxially through the air vent tube 44. A plurality of radially directed struts 48 having lubricating passages therein provide a supply of lubricant from the lubricant tube 38 to various bearings.

The single large air vent tube 44 extends to the rear of the power shaft 10 and is provided with any suitable number of radially outwardly projecting vent air discharge tubes 50 (FIG. 5), herein shown to be four in number, disposed to the rear of the rear turbine wheel 18. Moreover, suitable porting 52 in the wall of a hub 54 abutting the rear turbine wheel established communication between the tubes 50 and the stream of exhaust gases from the engine.

In FIGURE 6, there is schematically depicted a lubrication system which includes a tank 56 for a suitable lubricant such as oil, a conduit 58 for returning scavenge oil to the tank and a conduit 60 and pump 62 for supplying lubricating oil under pressure from the tank to various portions of the engine. The portion of tank 56 above the level of the lubricant is in communication with shaft 12 ahead of the baffle cap structure 22 through a conduit 64 and a port 66.

Considering the operation of the system, it may be noted that the pressure of the motive fluid at the turbine exhaust is somewhere near ambient atmospheric pressure. It may be below atmospheric pressure, because the exhaust duct expands in area downstream from the turbine and the exhaust velocity of a turboprop engine ordinarily is low. Since the oil-laden air from within the engine or from oil tank 56 must escape through the vent pipes in the engine shaft to the exhaust duct, the air vented will build up a pressure at the entrance to shaft 12 ahead of baffle cap 24 sufficient to cause the air to flow through the vent pipes. Only a small pressure difference is required to support the air flow.

It will be seen, therefore, that there is a pressure drop between the vent air entry and the vent outlet thereby resulting in the flow of vent air without any substantial aspirating effect. As the air to be vented leaves the tank 56, it will contain in the form of a mist or spray fine drops of oil. Upon the oil-bearing air impinging upon the baffle cap 22, much of the liquid droplets will be deposited outside the hollow forward power shaft section 12 for return through suitable means to the tank. The air which has thus been relieved of most of the liquid which had been contained therein, then passes through the forward power shaft section 12 and enters the vent tubes 34. The air will then travel through the vent tubes 34 until discharged into the single vent tube 44 for passage to the vent air exit defined by the radiating tubes 50 and porting 52. Thereafter, the vent air will pass between the wall 20 of the tailcone construction and the rear turbine wheel 18 into the engine exhaust stream.

It will be seen that we have provided a novel and unique vent system for a turbine engine which directs all vent air into the engine exhaust stream at the rear of the engine rather than conducting the air to atmosphere at a forward portion of the engine. As a result, although there may be some particles of oil still contained in the vented air, they are discharged into the exhaust stream rather than forming a coating upon the exterior of the engine housing.

We claim:

1. A turbine engine comprising a hollow power shaft extending substantially throughout the length thereof, such shaft including forward, intermediate and rear sections, a turbine construction operatively connected to said rear shaft section to rotatably drive said shaft, means formed on said engine to the rear of said turbine construction to form a radial vent air outlet passage communicating the interior of said shaft to engine exhaust, a lubrication vent system for supplying air axially within said shaft to said outlet passage, said system comprising conduit means for conducting oil laden vent air from a lubricant containing reservoir to said forward shaft section, means for removing some of the oil from the laden air for return to the reservoir including a substantially cup-shaped baffling cap closing the forward end of said forward shaft section, a plurality of vent air inlet passage in the side wall of said cap for thereafter directing vent air radially inwardly and into the interior of said forward shaft section, a plurality of vent air tubes coaxially mounted within said intermediate shaft section and in communication with said forward shaft section, and a single relatively large vent tube mounted in said rear shaft section establishing communication between said plurality of vent tubes and said vent air outlet passage.

2. A lubrication vent system for a turbine engine of the type comprising a hollow power shaft extending substantially throughout the length thereof, said shaft including forward, intermediate and rear sections, a turbine construction disposed about and operatively connected to said rear shaft section to drive said shaft, a tailcone carried by said engine to the rear of said turbine construction; means to conduct air to be vented to said forward shaft section, a baffle cup disposed in and closing said forward shaft section, said cup comprising a transverse wall and a substantially cylindrical axially extending wall radially inwardly spaced from the inner wall of said forward shaft section, a plurality of vent air inlet passages formed in said cup side wall for directing vent air inwardly into the interior of said forward shaft section, a closure plate separating said forward and intermediate power shaft sections, a plurality of circumferentially spaced apertures in said plate, a plurality of parallel axially extending vent tubes supported in said apertures in communication with said forward shaft section, a plurality of support brackets disposed in said intermediate shaft section and having openings therein supporting intermediate portions of said vent tubes, said support brackets having additional apertures therein to equalize pressures in said intermediate shaft section to either side thereof, a relatively large vent tube in communication with said first-named vent tubes and supported in said rear shaft section, said large vent tube extending axially to the rear of said turbine construction within said power shaft, and vent air outlet means formed in a rear portion of said large vent tube, said delivery means including a vent air outlet passage extending radially outwardly between said turbine construction and said tail cone and establishing communication between said large tube and the engine exhaust stream.

3. A turbine engine comprising a hollow power shaft extending substantially throughout the length thereof, a turbine mechanism disposed to the rear of said engine for driving said shaft, means on said engine at the rear of said turbine mechanism to define therewith an air vent outlet passage establishing communication between said hollow power shaft and engine exhaust, a lubrication system including means supplying oil mist laden vent air through said shaft to said passage, and means in the shaft to remove some of the oil from the vent air for return to said lubrication system.

4. A gas turbine engine comprising, in combination, a hollow power shaft extending through at least the major part of the length of the engine, a turbine at the rear end of the shaft for driving the shaft, means including a tailcone defining an engine exhaust from the turbine at the rear end of the turbine, the engine including means generating oil mist laden air requiring venting from the engine when the engine is in operation, the said generating means being connected to the shaft to deliver the laden air thereinto, means in the shaft for removing some of the oil from the laden air, conduit means in the shaft for thereafter conducting the laden air through the shaft to the rear end of the turbine, and a vent defined by the shaft at the rear end of the turbine venting the laden air into the engine exhaust between the turbine and the tailcone.

5. A gas turbine engine comprising, in combination, a hollow power shaft extending through at least the major part of the length of the engine, a turbine at the rear end of the shaft for driving the shaft, means including a tailcone defining an engine exhaust from the turbine at the rear end of the turbine, the engine including means generating oil mist laden air requiring venting from the engine when the engine is in operation, the said generating means being connected to the forward end of the shaft to deliver the laden air thereto, means in the shaft for removing some of the oil from the laden air including a shaft rotated centrifugal separator, conduit means in the shaft for thereafter conducting the laden air through the shaft to the rear end of the turbine, and a vent defined by the shaft at the rear end of the turbine venting the laden air into the engine exhaust.

6. A gas turbine engine comprising, in combination, a hollow power shaft extending through at least the major part of the length of the engine, a turbine at the rear end of the shaft for driving the shaft, means including a tailcone defining an engine exhaust at the rear end of the turbine, the engine including means generating oil mist laden air requiring venting from the engine when the engine is in operation, the said generating means being connected to the forward end of the shaft to deliver the laden air thereto, means in the shaft for removing some of the oil from the laden air including a shaft rotated centrifugal separator, conduit means in the shaft for thereafter conducting the laden air through the shaft to the rear end of the turbine, and a vent defined by the shaft at the rear end of the turbine for venting the laden air into the engine exhaust, the conduit means including interconnecting vent air tubes mounted in and extending through the rear portion of the shaft to isolate the vented air from the wall of the shaft.

References Cited in the file of this patent

UNITED STATES PATENTS

| | | |
|---|---|---|
| 2,613,498 | Prendergast | Oct. 14, 1952 |
| 2,804,280 | Wheatley | Aug. 27, 1957 |
| 2,870,870 | Haworth et al. | Jan. 27, 1959 |

UNITED STATES PATENT OFFICE
CERTIFICATE OF CORRECTION

Patent No. 3,041,832　　　　　　　　　　　　　July 3, 1962

Robert P. Atkinson et al.

It is hereby certified that error appears in the above numbered patent requiring correction and that the said Letters Patent should read as corrected below.

Column 3, line 7, "Threfore" read -- Therefore --; line 27, for "established" read -- establishes --; column 4, line 20, for "passage" read -- passages --; column 5, lines 2 and 18, strike out "for", each occurrence.

Signed and sealed this 25th day of December 1962.

(SEAL)
Attest:

ERNEST W. SWIDER
Attesting Officer

DAVID L. LADD
Commissioner of Patents